(12) United States Patent
Luo et al.

(10) Patent No.: US 6,377,551 B1
(45) Date of Patent: Apr. 23, 2002

(54) QOS BASED ROUTE DETERMINATION METHOD FOR COMMUNICATIONS NETWORKS

(75) Inventors: Gang Luo; Kaiyuan Huang, both of Kanata; Jianli Wang, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/134,924

(22) Filed: Aug. 17, 1998

(51) Int. Cl.[7] .............................................. H04L 12/28
(52) U.S. Cl. ...................... 370/238; 370/351
(58) Field of Search ................................ 370/229, 236, 370/238, 254, 255, 351, 389, 400, 410, 465; 709/238, 239, 240, 241, 242, 243, 244; 340/825.03, 826, 827

(56) References Cited

U.S. PATENT DOCUMENTS

| | | | | |
|---|---|---|---|---|
| 4,905,233 A | * | 2/1990 | Cain et al. ................... | 370/400 |
| 5,467,343 A | | 11/1995 | Lee et al. | |
| 5,535,195 A | * | 7/1996 | Lee ............................ | 370/256 |
| 5,596,719 A | * | 1/1997 | Ramakrishnan et al. .... | 370/238 |
| 5,629,930 A | * | 5/1997 | Besai et al. .................. | 370/412 |
| 5,754,543 A | * | 5/1998 | Seid ............................ | 370/351 |
| 5,933,425 A | * | 8/1999 | Iwata .......................... | 370/351 |

OTHER PUBLICATIONS

Christos Papadimitriou and Kenneth Steiglitz, "Combinatorial Optimization: Algorithms and Complexity", (1982), Prentice–Hall, pp. 128–129.

Zheng Wang and Jon Crowcroft, "Quality–of–Service Routing for Supporting Multimedia Applications", (1996), IEEE Journal on Selected Areas in Communications, vol. 14, No. 7, Sep. 1996, pp. 1228–1234.

Atsushi Iwata et al., "PNNI Routing Algorithms for Multimedia ATM Internet", (1997), NEC Res. And Develop., vol. 38, No. 1, Jan. 1997, pp.60–73.

Jeffrey Jaffe, "Algorithms for Finding Paths with Multiple Constraints", NETWORKS, vol. 14 (1984), pp.95–116.

* cited by examiner

Primary Examiner—Huy D. Vu

(57) ABSTRACT

A method is described for route computation in Communications Networks with multiple QoS metrics. This method takes a metric (say, cost) as an optimization target and the other metric (say, delay) as a constraint. A communication network with multiple QoS metrics associated to its links is modelled as a graph with multiple QoS metrics as weights associated to its links. The method associates constraints with nodes in the graph after generating a minimum spanning tree based at a destination node using Dijkstra's algorithm with the constraint metric as link weight. A set is populated with nodes whose path to the destination node satisfies given constraints while endeavouring to optimize another QoS metric. A path may be computed by selecting, from the set, the destination node and associated predecessor nodes through to the start node. The algorithm of the method is very efficient and its computational complexity is $O(n^2)$. This method can guarantee to find a nearly optimal path with the given constraint satisfied as long as there exists such a path.

26 Claims, 17 Drawing Sheets

QOS BASED ROUTE DETERMINATION METHOD FOR COMMUNICATIONS NETWORKS

FIELD OF THE INVENTION

The present invention relates to route computation for communication networks and particularly to a method for use in communication networks with multiple "Quality of Service" metrics.

BACKGROUND OF THE INVENTION

"Quality of Service" (QoS) metrics provide measures of performance. Multimedia applications such as digital video and audio often have stringent QoS requirements. In order to deliver performance guarantees, a network has to make resource reservations and exercise network control.

In traditional data networks, achieving an end-to-end connection was the sole or primary goal of routing. Routing protocols usually characterized the network with a single metric, such as hop-count or delay, and used shortest path algorithms for path computation. However, in order to support a wide range of QoS requirements, routing protocols need to have a more complex model where the network is characterized with multiple metrics, such as cost, delay, delay variability, loss probability and bandwidth. The basic objective with QoS routing is to find a path with the lowest cost (or shortest distance) that satisfies one or more QoS constraints in communication networks.

The difficulty in achieving this objective is that the computational complexity is NP-HARD (defined as a problem with n variables for which the computation time is higher than $a^n$, for some a>1) and therefore, for all practical purposes, designing a perfect, efficient algorithm for achieving this objective is impossible.

Dijkstra's algorithm, which was developed by Edsger Dijkstra in 1959, is a well known method described in, for example, C. Papadimitriou, K. Steiglitz, (1982), *Combinatorial Optimization: Algorithms and Complexity*, Prentice-Hall, the contents of which are incorporated herein by reference. Using the algorithm, finding the shortest path for travelling from a given vertex on a graph to every other vertex is possible. Dijkstra's algorithm takes a graph with weighted links and a given root vertex as its input and returns, as its output, a label for each vertex on the graph. In the case where the weights represent the length of the links, each vertex label represents the length of the shortest path from the root vertex to the particular vertex. The output is called a minimum spanning tree.

In Zheng Wang and Jon Crowcroft, "Quality of Service Routing for Supporting Multimedia Applications," (1996), *IEEE Jour. Sel. Area. Comm.*, Vol. 14, No. 17, pp. 1228–1234, a bandwidth constraint is factored into a search for the shortest path. This is accomplished by removing links that do not satisfy the bandwidth requirement.

Finding a solution for two or more additive QoS metrics remains an open issue. Current implementations of Asynchronous Transfer Mode Private Network-Network Interface (ATM PNNI) protocols use only Dijkstra's Algorithm to optimize the cost with other constraint metrics checked during the generation of the spanning tree. (See, for example, Atshushi Iwata, et al., "PNNI Routing Algorithms for Multimedia ATM Internet," (1997), *NEC Res. and Develop.*, Vol. 38, No. 1; Data Connection, (1997), *DC-PNNI Specification*.) If no route is found, the cost optimization is ignored and Dijkstra's Algorithm is used with one constraint metric chosen as the optimization target and with other constraint metrics checked during the generation of the spanning tree. This implies that once cost optimization fails with other constraint metrics satisfied, cost optimization is abandoned. The weakness of the current practice is that the network resources may be wasted because high cost routes are selected.

U.S. Pat. No. 5,467,343 issued Nov. 14, of 1995 to Lee describes another approach that focuses on the design of a function which combines multiple metrics into one and then applies Dijkstra's Algorithm. The drawback of this approach is that the selected route may not satisfy the constraints, which results in repetitive re-computation and dynamic redefinition of the function.

Algorithms can be evaluated by a variety of criteria. Most often the interest lies in the rate of growth of the time required to solve increasingly larger instances of a problem. The size of the problem is an integer associated with a problem. The associated integer is a measure of the quantity of input data. For example, the size of a graph problem might be the number of edges.

The time needed by an algorithm, expressed as a function of the size of the problem, is called the time complexity of the algorithm. The limiting behaviour of the time complexity as the size increases is called the asymptotic time complexity. It is the asymptotic time complexity of an algorithm that ultimately determines the size of problems that can be solved by the algorithm. If an algorithm processes inputs of size n in time $cn^2$ for some constant c, then it is said that the time complexity of that algorithm is $O(n^2)$, read "order $n^2$."

J. M. Jaffe, "Algorithms for Finding Paths with Multiple Constraints," (1984), *Networks*, Vol. 14, pp. 95–116, presents an algorithm that computes a path with two constraint metrics satisfied. That algorithm has the time complexity $O(b*n^5*\log(n*b))$ for n nodes with b as the largest possible weight or length.

SUMMARY OF THE INVENTION

An object of the present invention is to provide an improved route computation algorithm for communication networks with multiple quality of service metrics.

In accordance with an aspect of the present invention there is provided a route computation algorithm for communication networks with two quality of service metrics in which a spanning tree is generated which associates with each node a limiting constraint based on a secondary metric and computes a route from the start node to the destination node while selecting each link to both optimize the primary metric and stay within a limit on the secondary metric. In accordance with another aspect of the present invention the method is extended to compute a route to nearly optimize a primary metric while satisfying a limit on two or more secondary additive QoS metrics.

Accordingly, the present invention comprises a method for determining a route from a start node to a destination node in a communication system comprising nodes and links between said nodes, said method based on at least two quality of service link metrics, a primary link metric to be optimized and at least one secondary link metric to be limited to corresponding secondary link metric path constraints, each of said metrics being additive, said method comprising the steps of: for each of said at least one secondary link metric, associating a secondary link metric constraint with each of said nodes; initializing a set to include said start node; until said destination node is included in said set, undertaking the following steps: (a) for each node with a specified link to a node most recently included in said set, if a sum of a primary link metric of said most recently included node and a primary link metric associated with said link between said each node and said most recently included node is more optimal than any primary link metric associated with said each node and a first of said at least one secondary link metric constraints associated with said each node is more optimal than a corresponding secondary link metric constraint associated with said most recently included node then, associating said each node with said most recently included node and associating said new primary link metric with said each node, including a node in said set where said node was not in said set and had a primary link metric which was more optimal than any primary link metric associated with any other node not in said set; and selecting a route based on nodes in said set.

In other aspects, the method is applied in a router, a computer software media product and a communications system.

Advantages of the present invention are that the algorithm is very efficient and its computational complexity is $O(n^3)$.

BRIEF DESCRIPTION OF THE DRAWINGS

In the figures which illustrate example embodiments of this invention.

DETAILED DESCRIPTION OF THE PREFERRED EMBODIMENTS

We define a network G having N nodes and A links (G=(N, A)), a limiting constraint $d_{ki}$ ($d_{ki}>0$, $d_{ki}=\infty$ if no link exists between k and i) and an optimizing constraint $c_{ki}$ ($c_{ki}>0$) for the link (k, i) between each pair of nodes i and k in N, a path constraint D (D>0) and two specified nodes, s (the source node) and e (the end or destination node). By way of example, the optimizing constraint, $c_{ki}$, may be the cost of the link (k, i), the limiting constraint, $d_{ki}$, the delay of the link (k, i) and the path constraint, D, the maximum delay allowed along the path. The objective is to find a path p(s, e) between the source node and the end node such that the delay of the path (which is the sum of link delays over the path) does not exceed D and the cost of the path (which is the sum of link costs over the path) is minimized.

Figure 1:
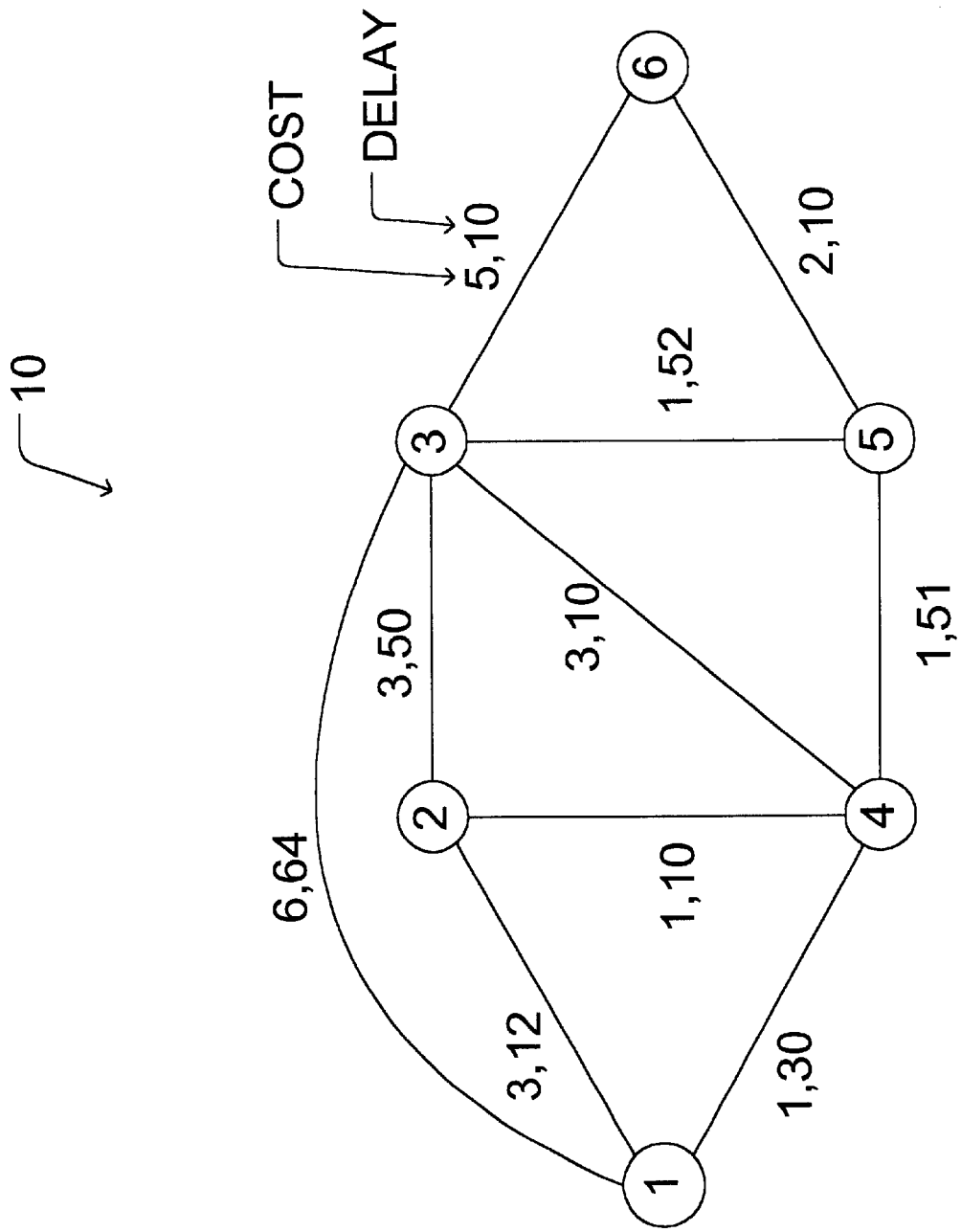
FIG. 1 is a schematic network of nodes representing a communications network.

Referring to FIG. 1, which models a communication system 10 as a graph of nodes, the link (k, i) between each pair of nodes is shown to have an associated cost and delay.

A path meeting the objective (of the nearly lowest cost while not exceeding the maximum delay along the path) may be found in two phases, denoted Phase I and Phase II. In phase I, constraints $D_i$ for all nodes i are derived by generating a minimum spanning tree, rooted at the destination node e employing Dijkstra's Algorithm. In phase II, a greedy algorithm (selecting the link with minimum cost) is used to generate a route from the source, s, to the destination, e. The route is generated while satisfying constraints based on the values calculated in phase I.

Figure 2:
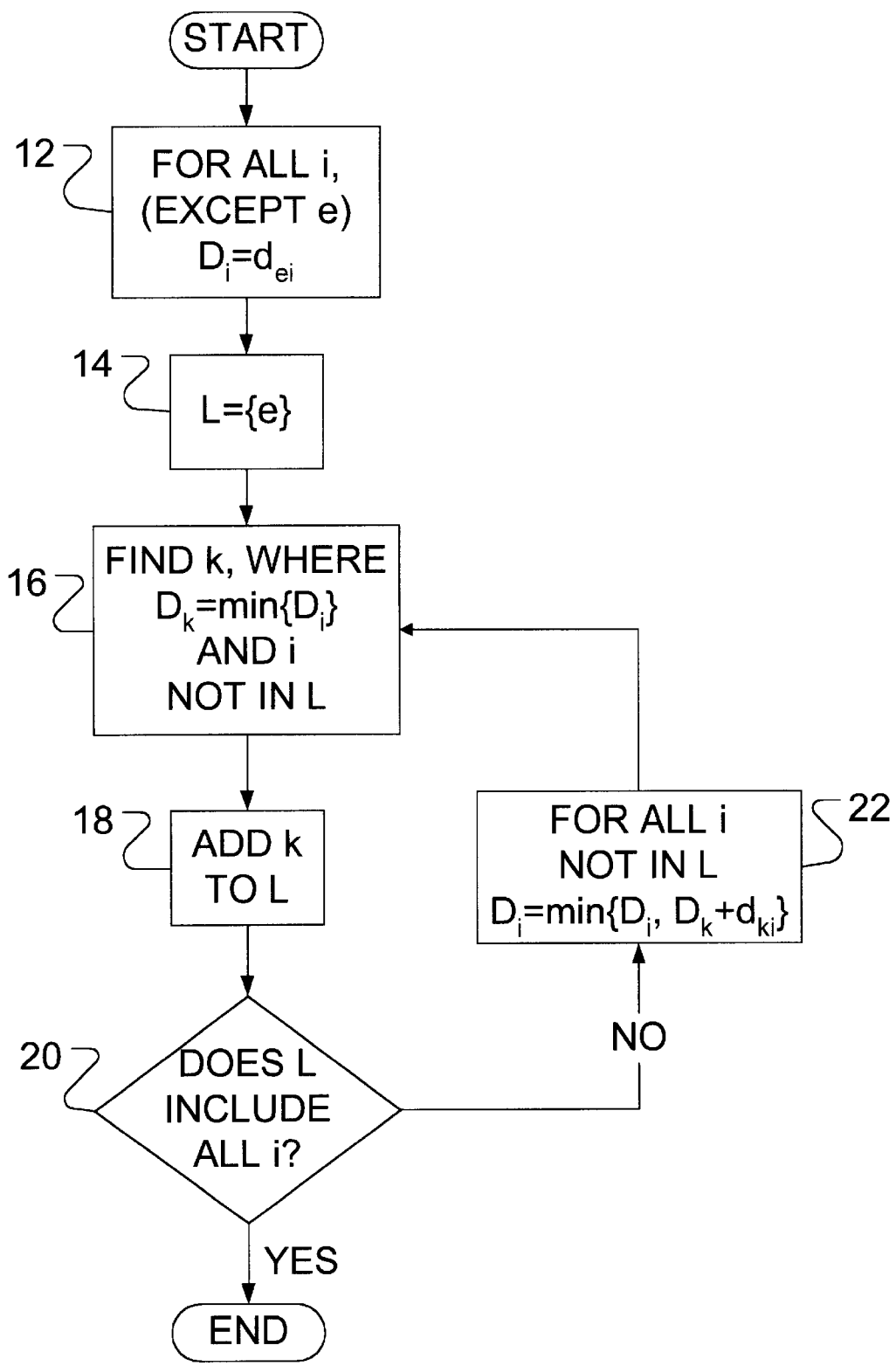
FIG. 2 illustrates, in a flow diagram, the steps of phase I of a first embodiment of the invention.

Referring to FIG. 2, which is a flow diagram of the steps of phase I, it is assumed for purposes of illustration that the link constraints $d_{ki}$ represent link delays and the path constraint D represents a maximum allowable path delay. An initial constraint $D_i$ (which, it will be noted, is not the path constraint, D) is associated with every node i (step 12) equivalent to $d_{ei}$, the delay for the link from node i to e (which is $\infty$ where a link does not exist between i and e).

A set L is initialized with one element, that being the destination node, e (step 14) and Dijkstra's Algorithm proceeds as follows. A node, k, is chosen from the nodes, i, that are not already in the set L such that the constraint associated with node k, $D_k$, is the minimum of all $D_i$'s (step 16). The node k is then added to the set L (step 18). If set L contains all nodes, phase I is finished (step 20). If some nodes are not in L, the $D_i$'s of such nodes are reevaluated as follows. For each node i not in set L, a new constraint $D_i$ is assigned which is the lesser of either the current constraint $D_i$ or the sum of the constraint associated with the most recently added node, $D_k$ and the delay, $d_{ki}$, from k to i (step 22). When the new $D_i$'s have been assigned, the process returns to step 16 to select another node to add to set L. After the termination of Phase I, the resulting updated constraints, $D_i$, represent the minimum delay from the destination node, e, to each node i.

Figure 3:
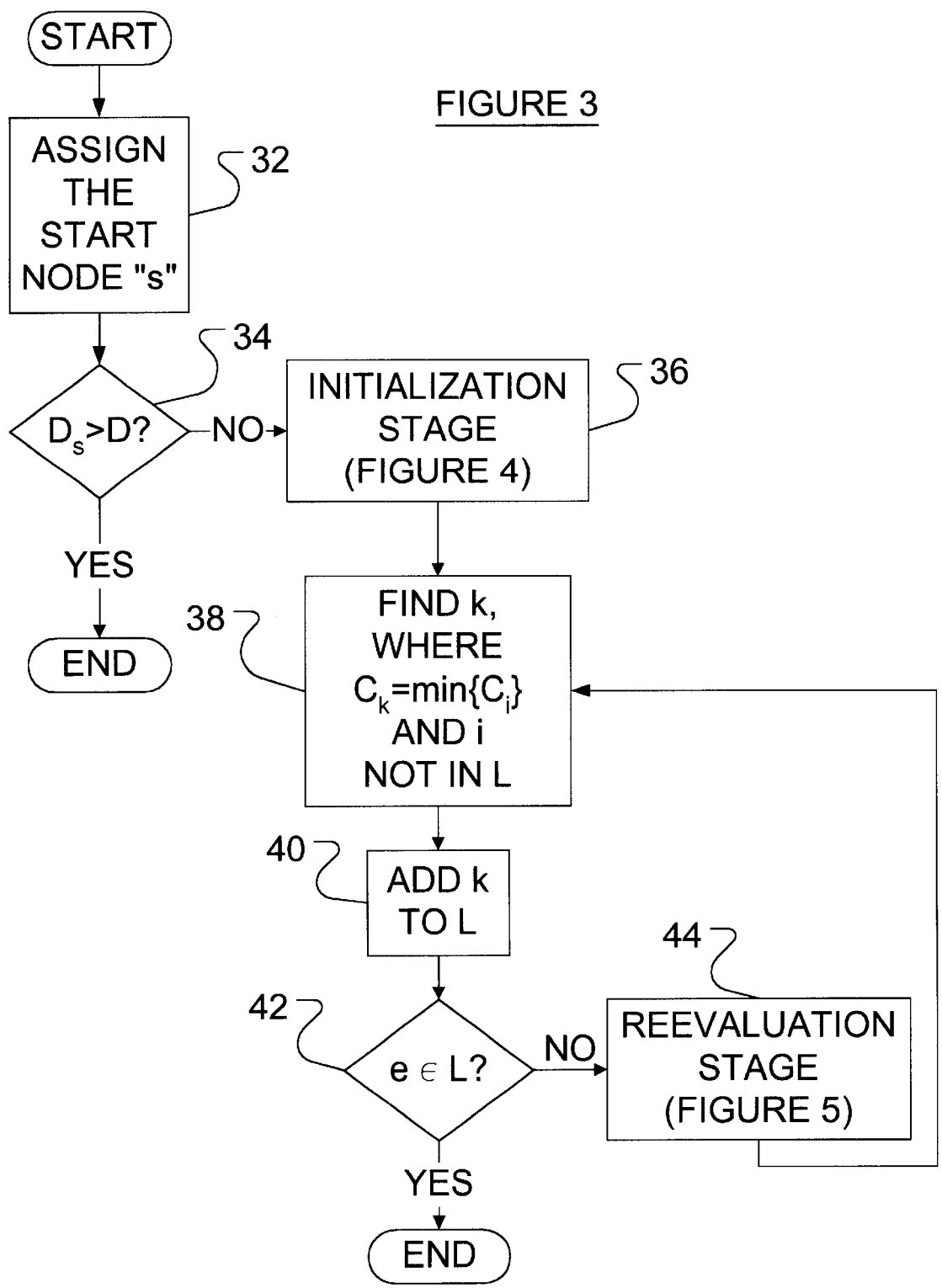
FIG. 3 illustrates, in a flow diagram, the steps of phase II of a first embodiment of the invention.

Referring now to FIG. 3, which is a flow diagram outlining the steps of phase II of this embodiment of the invention, the label "s" is assigned to the start node (step 32). The delay constraint, $D_s$, associated with the start node in phase I is compared with the path constraint, D (step 34). If $D_s$ exceeds D, a path that satisfies the constraint does not exist and the process is stopped. If $D_s$ does not exceed D, the process advances to the initialization stage (step 36) detailed in FIG. 4.

Figure 4:
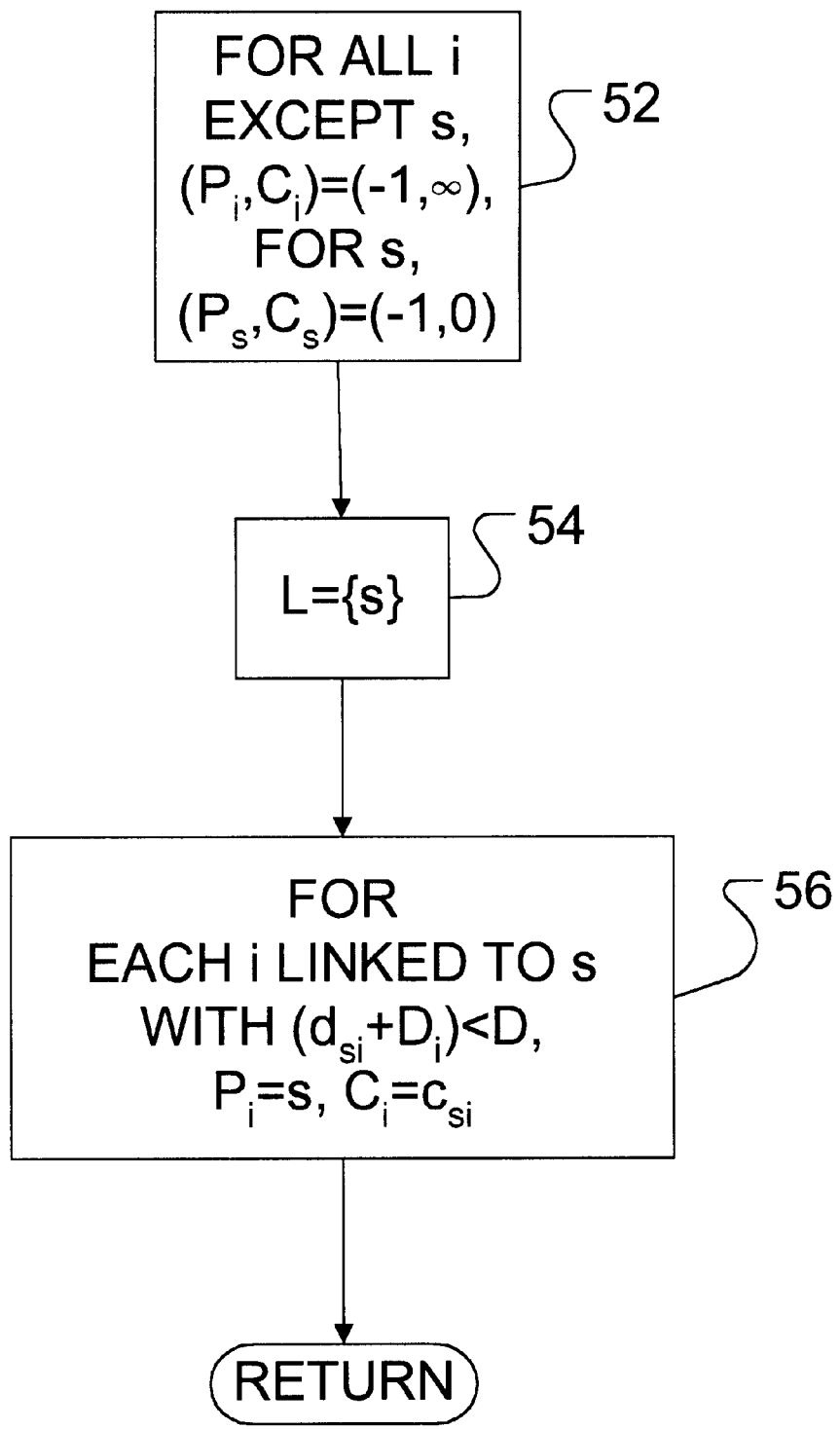
FIG. 4 illustrates, in a flow diagram, the steps of the initialization stage of phase II of a first embodiment of the invention.

Referring to FIG. 4, which illustrates in a flow diagram the steps required in the initialization stage of phase II of this embodiment of the invention, each node i is associated with a pair ($P_i$, $C_i$), where $P_i$ is the current predecessor of the node i and $C_i$ is the cost from the source s to the node i for the path so far selected. The pairs for all nodes i are initialized with values $P_i=-1$, where $-1$ represents the situation in which no current predecessor of the node i is determined, and, for all nodes except node s, $C_i=\infty$. $C_s$ is assigned the value zero (step 52).

The set L is initialized with the start node, s (step 54). The set of nodes i under consideration is then reduced to those that have a link to s and for which the delay constraint of the link (s, i), $d_{si}$, when added to the delay constraint of the node i, $D_i$, is less than the path constraint, D. The nodes not meeting these conditions are disregarded. For the nodes i that meet the above conditions, $C_i$ is assigned the cost $c_{si}$, of the link (s, i) and the value s is assigned to $P_i$ (step 56).

Referring again to FIG. 3, a node k is chosen from all nodes i that are not already in the set L such that $C_k$ is the minimum of the $C_i$'s under consideration (step 38). Once k is determined, it is added to the set L (step 40). It is then determined whether the destination node is part of the set L (step 42). If the destination node is part of the set L, then phase II is complete. If the destination node is not part of set L, the process advances to the reevaluation stage.

Figure 5:
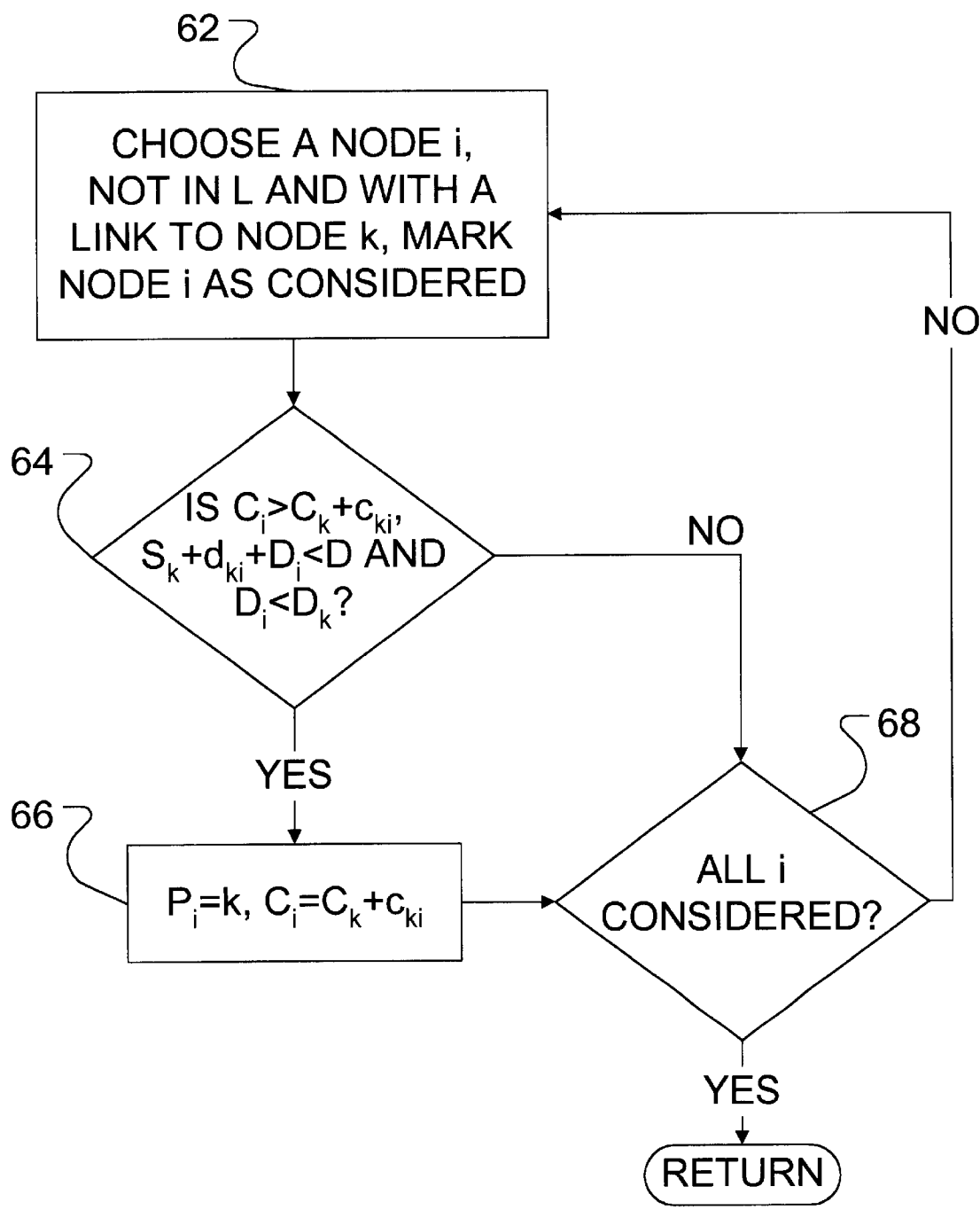
FIG. 5 illustrates, in a flow diagram, the steps of the reevaluation stage of phase II of a first embodiment of the invention.

FIG. 5 illustrates, in a flow diagram, the steps involved in the reevaluation stage. Each node i which has a link to the most recently chosen node, k, and is not already in the set L, is tested regarding three criteria (step 62) to determine whether to reassign the values ($P_i$, $C_i$). First, the value $C_i$ is compared with the sum of the cost associated with the node most recently added to set L, $C_k$, and the cost of the link (k, i), $c_{ki}$. If the extension of the path so far established to node i has a higher cost than is already assigned to node i, reevaluation is not beneficial. Secondly, a sum of $S_k$ (the sum of the link delays from the source node up to node k along a path defined by the predecessor node assignments linking node k with node s), $d_{ki}$ (the delay of link (k, i)) and $D_i$ (the constraint associated with a node i) must not exceed the path constraint, D. This eliminates from reevaluation any node whose choice as next node in the path would cause the path delay to exceed the path constraint. Thirdly, the delay constraint of a node i, $D_i$, is compared with the delay constraint of node k, $D_k$ (step 64). This last comparison is used to maintain a trend of decreasing delay constraints for reasons explained hereafter. In the event that $C_i$ is greater than the sum of $C_k$ and $c_{ki}$, the sum of delays $S_k$, $d_{ki}$ and $D_i$ does not exceed D, and $D_i$ is less than $D_k$ then the value of $C_i$ is reassigned to be the sum of $C_k$ and $C_{ki}$. As well, $P_i$ is assigned the value k (step 66). If one of the three conditions is not met, the process continues without changing the value of $C_i$ or $P_i$. It will be appreciated that reassigning the value of $P_i$ has the effect of including the link from k to i in a spanning tree of paths that meet the path delay constraints while minimizing cost.

It will be noted that if the trend of decreasing delay constraints is satisfied, for any node i of the spanning tree so far obtained, there is a path from i to e such that none of the links of the path is in the spanning tree so far obtained and such that the delay of this path, from i to e, is equal to $D_i$. Therefore, this criterion guarantees that the path from s to e may not double back and that the spanning tree so far obtained can be grown without violating the path constraint D.

Referring to FIG. 3, once the reevaluation of the cost associated with each node, $C_i$, is complete, the process reverts to step 38. Consequently, in phase II, after a given node is assigned a particular predecessor node, $P_i$, then that predecessor node will be part of the optimized route if the given node turns out to be part of the optimized route.

By way of example consider the network of FIG. 1 with a path constraint, D, of 70 time units and where the destination node, e, is node 6.

Figure 6:
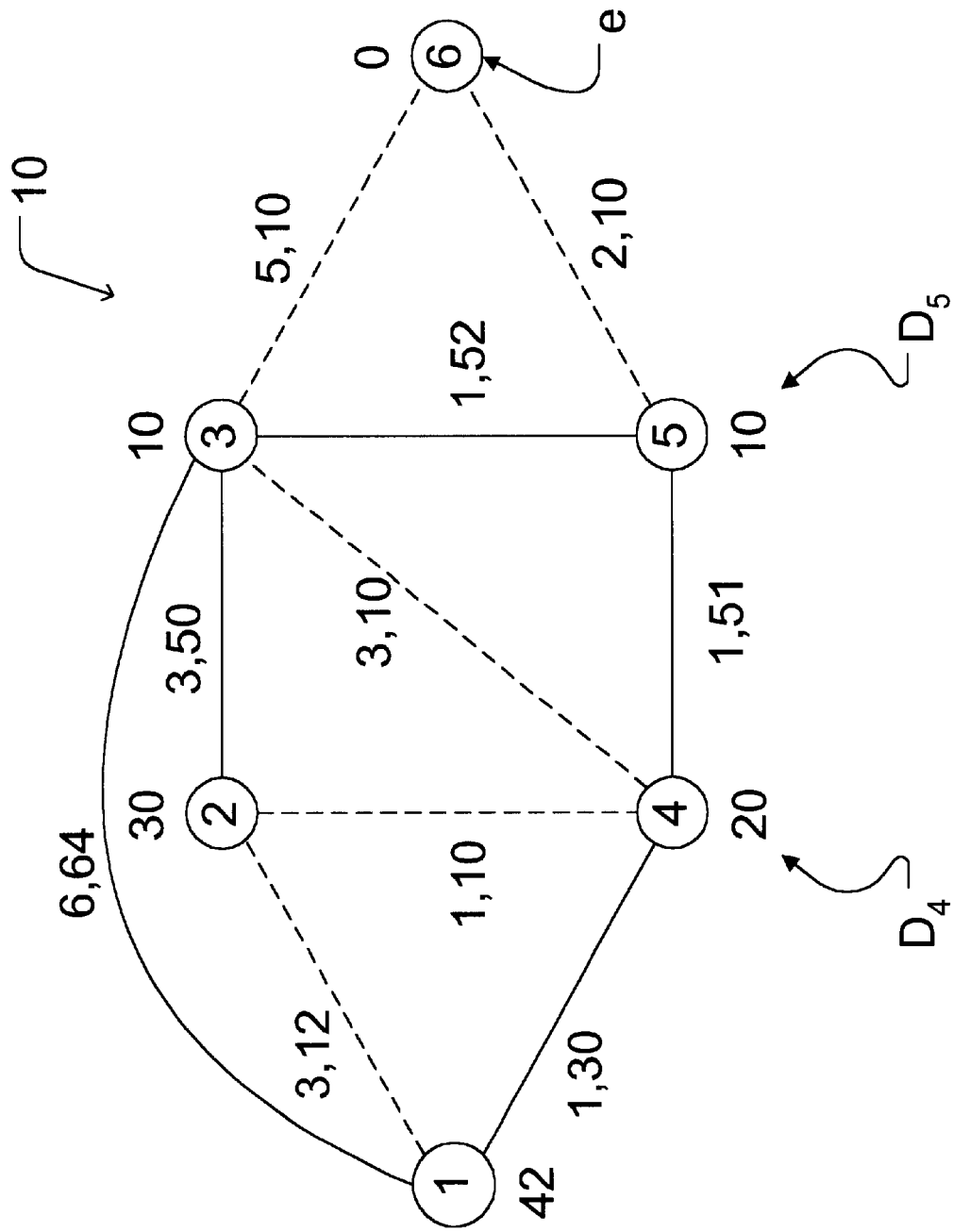
FIGS. 6 to 11 illustrate an example of the application of the method of FIGS. 2 to 5 to the network of FIG. 1.

Phase I—FIG. 6

After the application of phase I, each node has an associated delay constraint, $D_i$ representing the shortest possible delay from the node to the destination node. For example, as seen in FIG. 6, the associated delay constraint for node 4, $D_4$, is 20 time units. The minimum spanning tree for the network (10, FIG. 1) is comprised of the links shown as dashed lines in FIG. 6. This tree includes the links used in obtaining the delay constraint, $D_i$, for each node. Thus the tree includes the shortest path from a given node to the destination node in terms of delay.

Phase II

Figure 7:
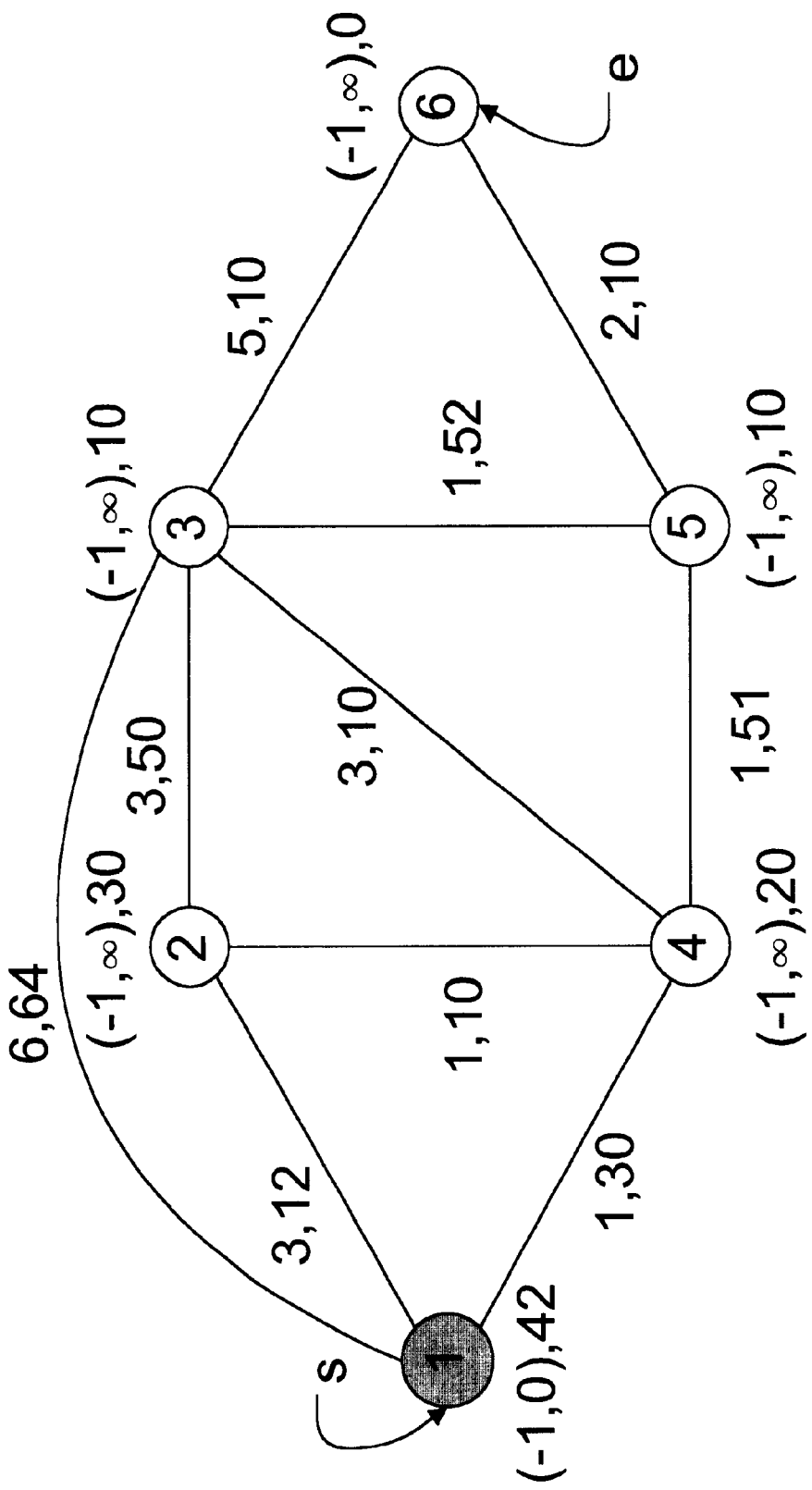

Step 1—FIG. 7

Phase II is initialized by selecting the source node s, which, for the purposes of this example is node 1 (FIG. 3, step 32). Since $D_s$=42<70=D, then the initialization stage follows. The source node s is associated with ($P_s$, $C_s$)=(-1, 0), and all other nodes i are associated with ($P_i$, $C_i$)=(-1, ∞), respectively (FIG. 4, step 52). Now L={1}.

Figure 8:
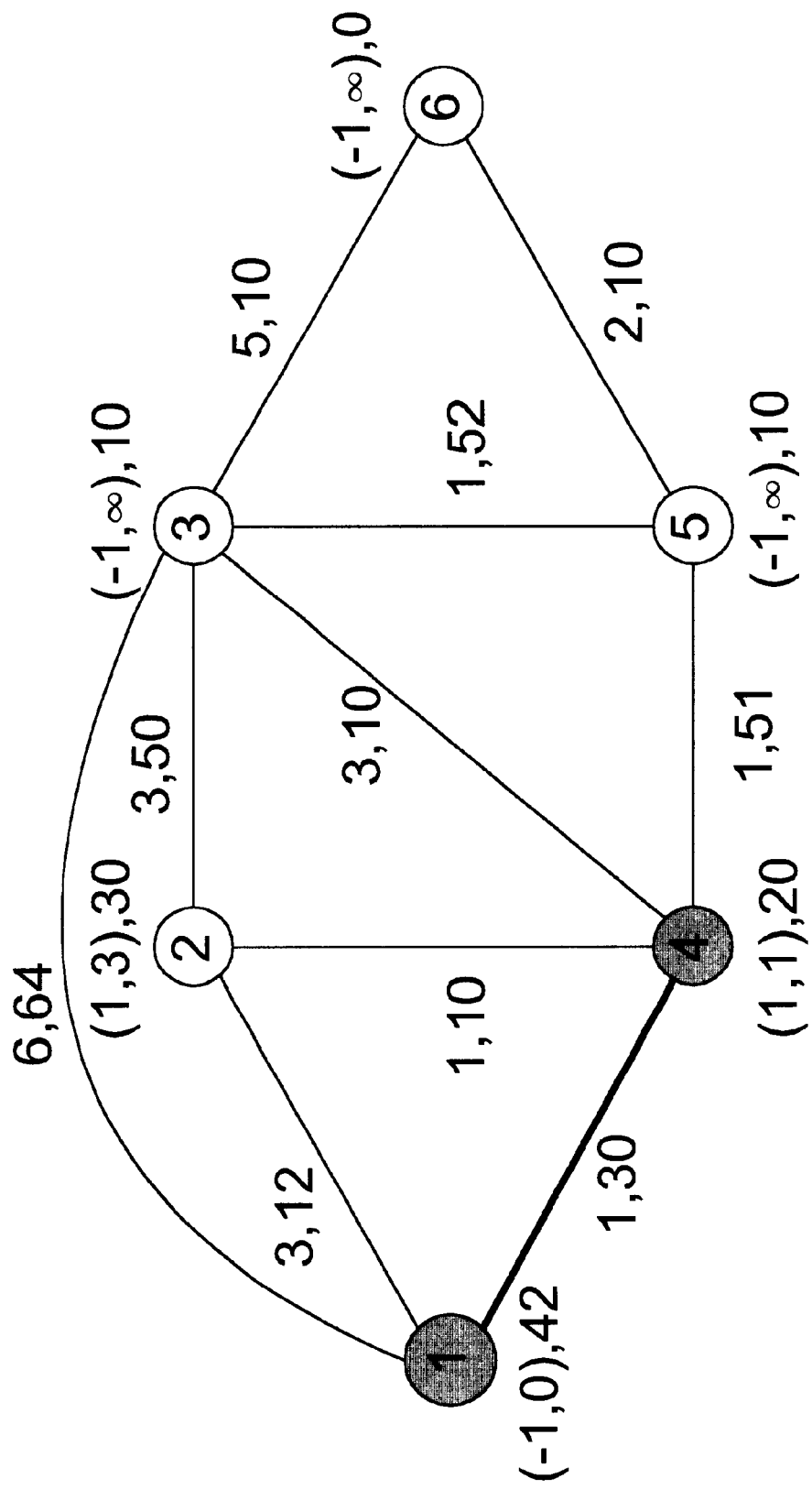

Step 2—FIG. 8

The values in the pair, ($P_i$, $C_i$), associated with nodes 2 and 4 are reassigned such that these nodes are associated with the start node ($P_2$=$P_3$=1) and the cost associated with each node comprises the null cost associated with the start node plus the cost over the link with the start node. Node 3 is disregarded because the delay of the link (1, 3), $d_{13}$, when added to the delay constraint of node 3, $D_3$, exceeds the path constraint, D. Node 5 and 6 are disregarded because they do not have a link to node 1 (FIG. 4, step 56). Node 4 is then added to set L as its associated cost is the minimum of the costs associated with the nodes not in set L (FIG. 3, step 38). Now L={1, 4}.

Figure 9:
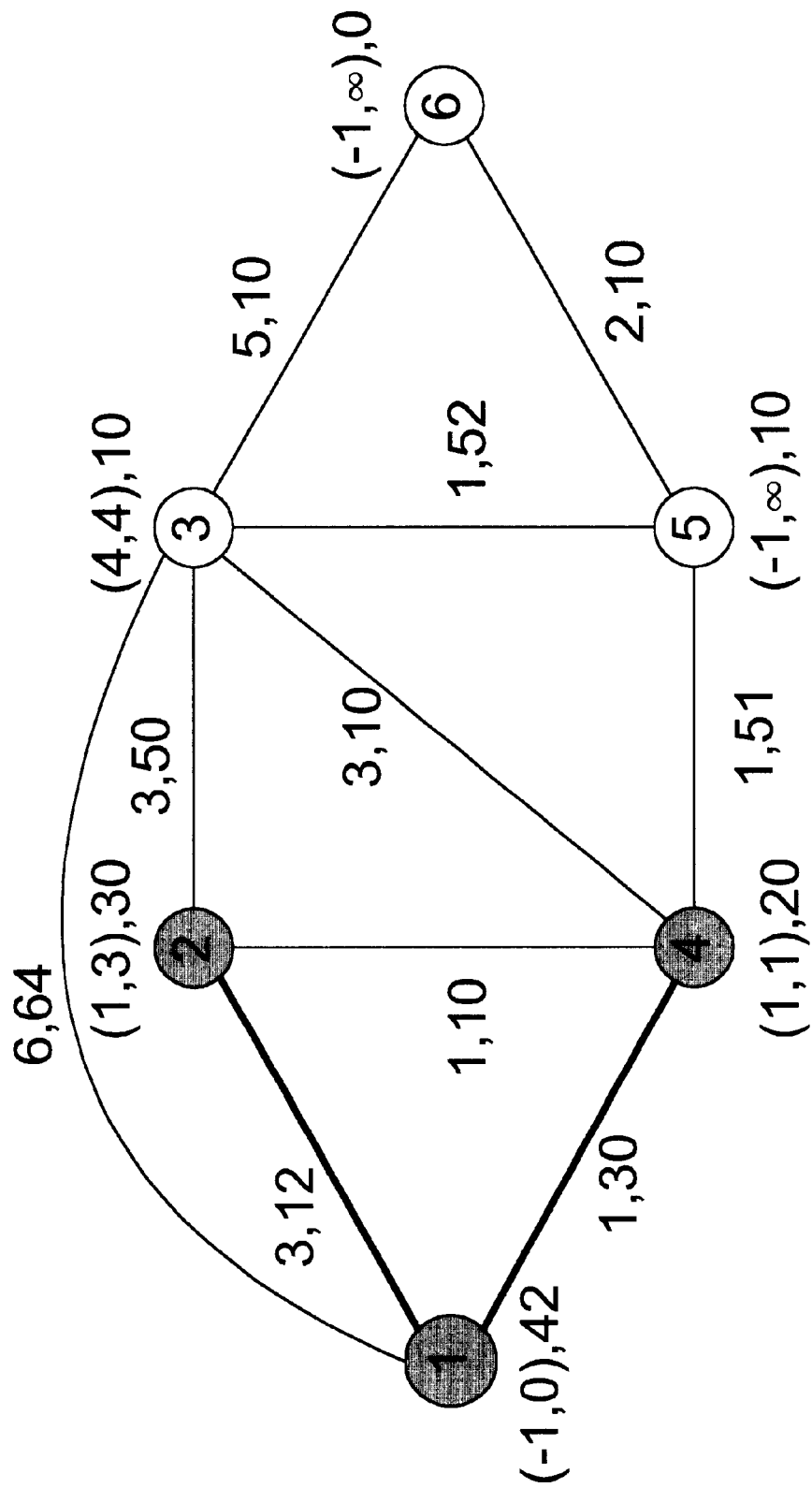

Step 3—FIG. 9

Since, after the addition of node 4, set L does not contain the destination node (FIG. 3, step 42), the $C_i$'s are reevaluated (FIG. 3, step 44) by considering the nodes with a link to node 4 (FIG. 5, step 62). $C_2$ is not assigned a new value because $D_2$>$D_4$ which violates the criterion requiring a decreasing trend of delay constraints (FIG. 5, step 64). $P_3$ and $C_3$ are assigned new values (FIG. 5, step 66). $C_5$ is not assigned a new value because the delay up to node 4, $S_4$, when summed with the delay of the link (4, 5), $d_{45}$, and the delay constraint of node 5, $D_5$, exceeds the path constraint, D. $C_6$ is not assigned a new value due to the absence of a link (4, 6). Node 2 is added to set L because $C_2$ is the minimum of the costs associated with the nodes not in set L. Now L={1, 4, 2}.

Figure 10:
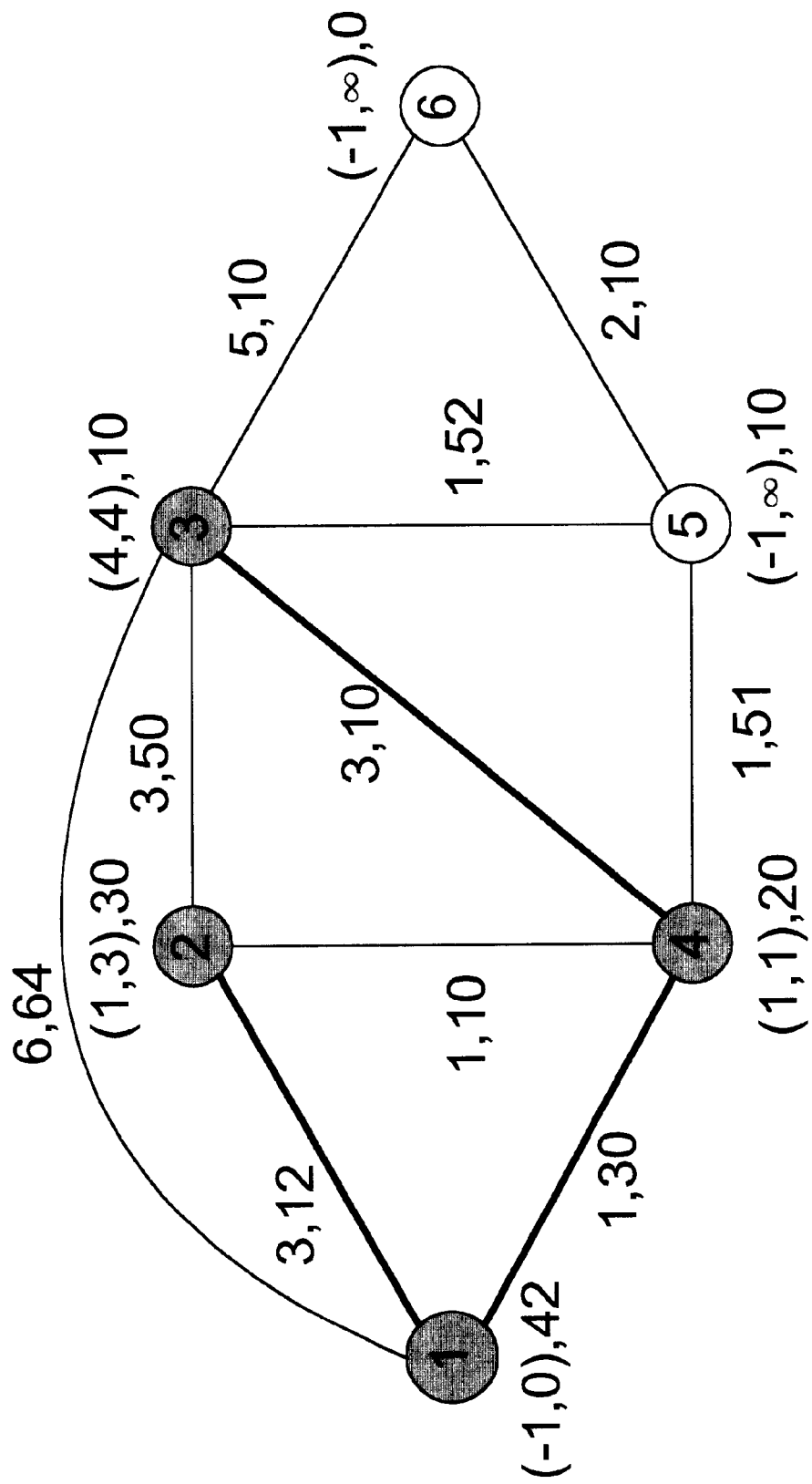

Step 4—FIG. 10

Nodes 5 and 6 do not have a link to node 2 and for this reason $C_5$ and $C_6$ are not assigned new values. Because the sum of $C_2$ and the cost of the link (2, 3), $c_{23}$, exceeds $C_3$, the value of $C_3$ is not changed. Node 3 is added to set L because $C_3$ is the minimum of the costs associated with the nodes not in set L. Now L={1, 4, 2, 3}.

Figure 11:
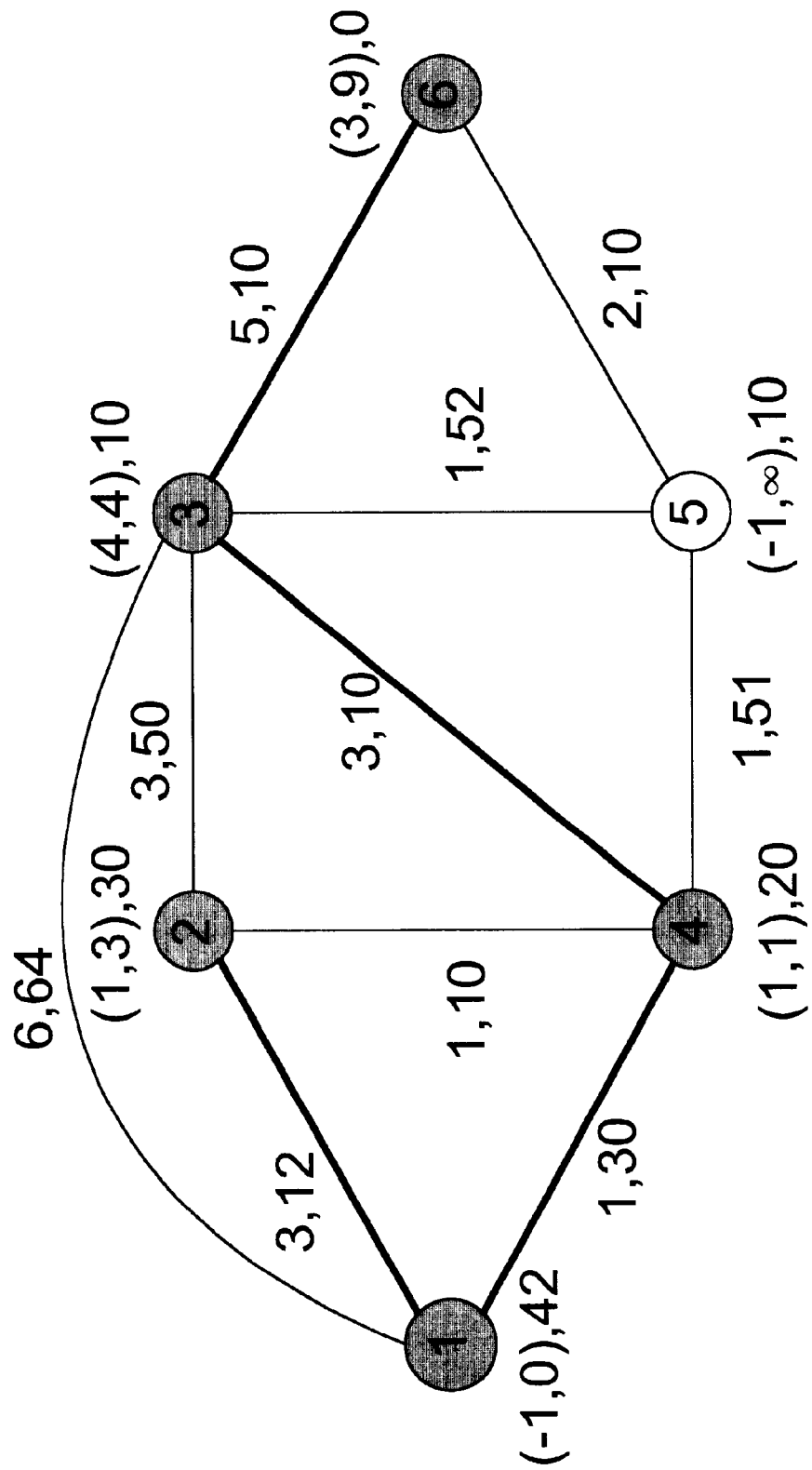

Step 5—FIG. 11

The value of $C_5$ is not reassigned because $D_5 \not< D_3$ so the decreasing trend of delay constraints would not continue. Node 6 is assigned new values for ($P_i$, $C_i$). Node 6 is added to set L because $C_6$ is the minimum of the costs associated with the nodes not in set L. Since set L now includes the destination node, the algorithm terminates.

The values of ($P_i$, $C_i$) now specify the minimum cost path whose summed link delays do not exceed the path constraint, D, of 70. More particularly, working backwards from the destination node utilizing the values of P to determine the path, the minimum cost path meeting the path constraint is 6-3-4-1.

The method above deals with an optimization constraint, cost, and a limiting constraint, delay, but can be extended to use in a system with an optimization constraint and m limiting constraints.

We define a network having N nodes and A links (G=(N, A)), m limiting constraints $d_{ki}^1, d_{ki}^2, \ldots, d_{ki}^m$ ($d_{ki}^j > 0$, j=1, 2, ..., m and $d_{ki}^j = \infty$ if no link exists between k and i) and an optimizing constraint $c_{ki}$ ($c_{ki} > 0$) for the link (k, i) between each pair of nodes i and k in N, m path constraints $D^j$ (D>0 j=1, 2, ..., m) and two specified nodes s (the source node) and e (the end or destination node). By way of example, the optimizing constraint, $c_{ki}$, may be the cost of the link (k, i), a first limiting constraint, $d_{ki}^1$, may be the delay of the link (k, i), a second limiting constraint, $d_{ki}^2$ may be the delay variation of the link (k, i), a first path constraint $D^1$, may be the maximum delay allowed along the path and a second path constraint $D^2$, may be the maximum delay variation allowed along the path. The objective is to find a path p(s, e) between the source node and the end node such that the sum of each of the delays and delay variations over the path does not exceed the corresponding path constraint, $D^1$, $D^2$, and the sum of the cost of the path (which is the sum of link costs over the path) is minimized.

Figure 12:
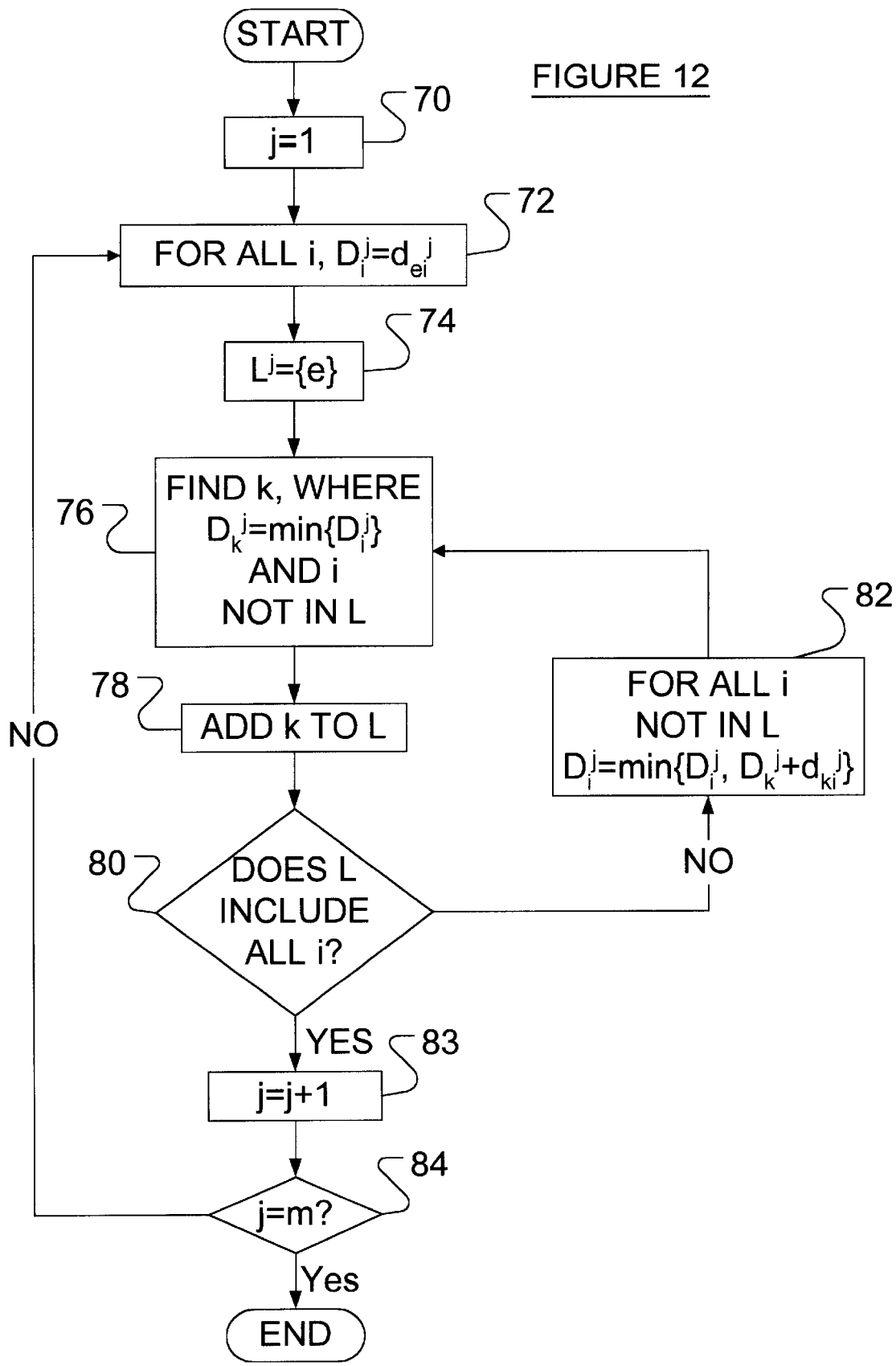
FIG. 12 illustrates, in a flow diagram, the steps of phase I of a second embodiment of the invention, where there are m constraint metrics.

Referring to FIG. 12, which is a flow diagram of the steps of phase I of this embodiment of the invention, for each j from 1 to m, Dijkstra's Algorithm proceeds once, as follows. An initial constraint $D_i^j$ (which, it will be noted, is not the path constraint $D^j$) is associated with every node i (step 72) equivalent to $d_{ei}^j$, the jth metric (say, delay) for the link from node i to e (which is $\infty$ where a link does not exist between i and e).

A set $L^j$ is initialized with one element, that being the destination node, e (step 74). A node, k, is chosen from the nodes, i, that are not already in the set $L^j$ such that the constraint associated with node k, $D_k^j$, is the minimum of all $D_i^j$'s (step 76). The node k is then added to the set $L^j$ (step 78). If set $L^j$ contains all nodes, phase I is finished for the one constraint (step 80). If some nodes are not in $L^j$, the $D_i^j$'s are reevaluated as follows. For each node i not in set $L^j$, a new constraint $D_i^j$ is assigned which is the lesser of either the current constraint $D_i^j$ or the sum of $D_k^j$ and the link constraint, $d_{ki}^j$, from k to i (step 82). When the new $D_i^j$'s have been assigned, the process returns to step 76 to select another node to add to set $L^j$. After the termination of Phase I, the resulting updated constraints, $D_i^j$, represent the minimum jth metric (say, delay) from the destination node, e, to each node i.

Figure 13:
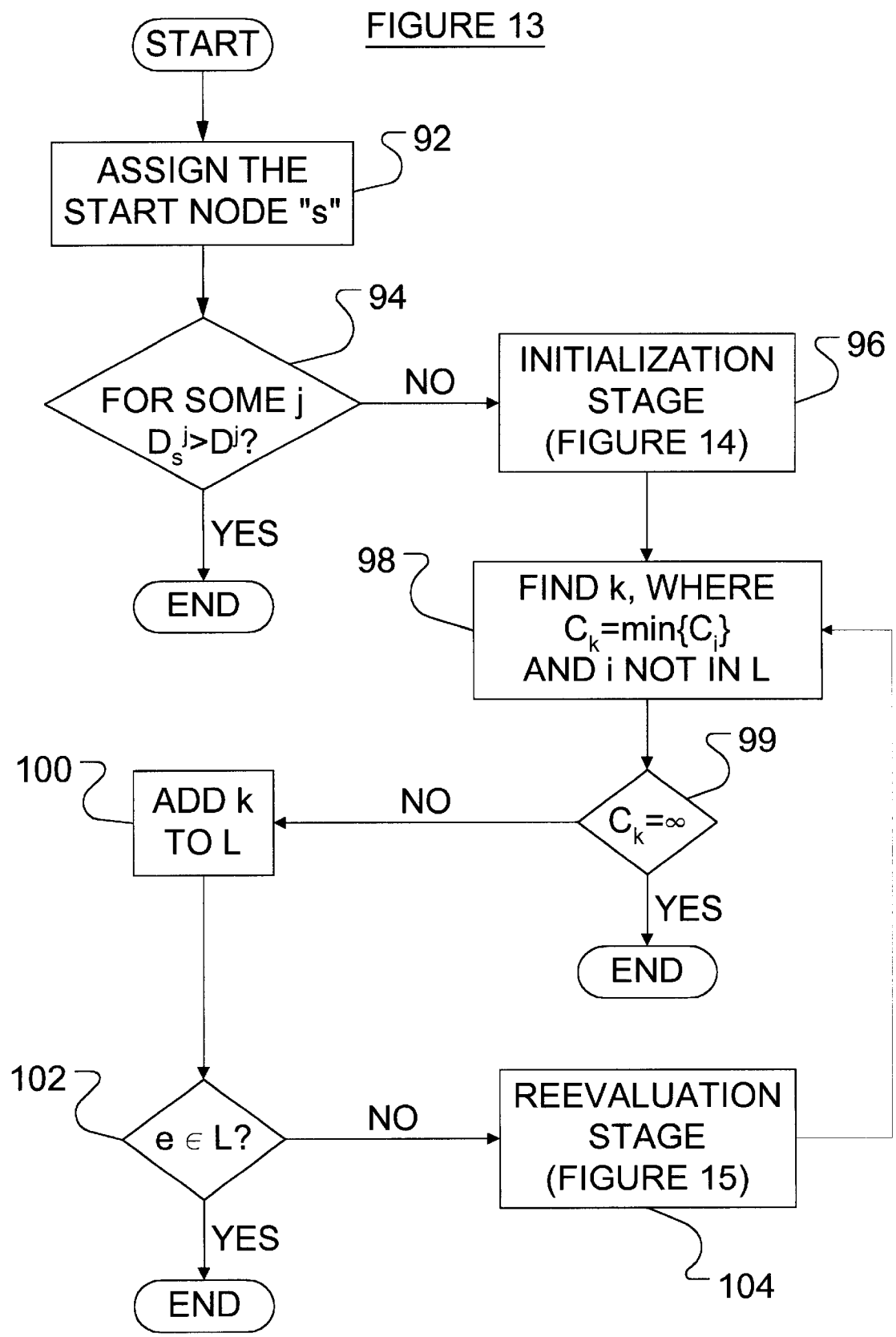
FIG. 13 illustrates, in a flow diagram, the steps of phase II of a second embodiment of the invention, where there are m constraint metrics.

Referring now to FIG. 13, which is a flow diagram outlining the steps of phase II of this embodiment of the invention, the label "s" is assigned to the start node (step 92). For each j, the constraint, $D_s^j$, associated with the start node in phase I, is compared with the path constraint $D^j$ (step 94). If, for any j, $D_s^j$ exceeds $D^j$, a path that satisfies the constraints does not exist and the process is stopped. If no $D_s^j$'s exceed corresponding $D^j$'s, the process advances to the initialization stage (step 96) detailed in FIG. 14.

Figure 14:
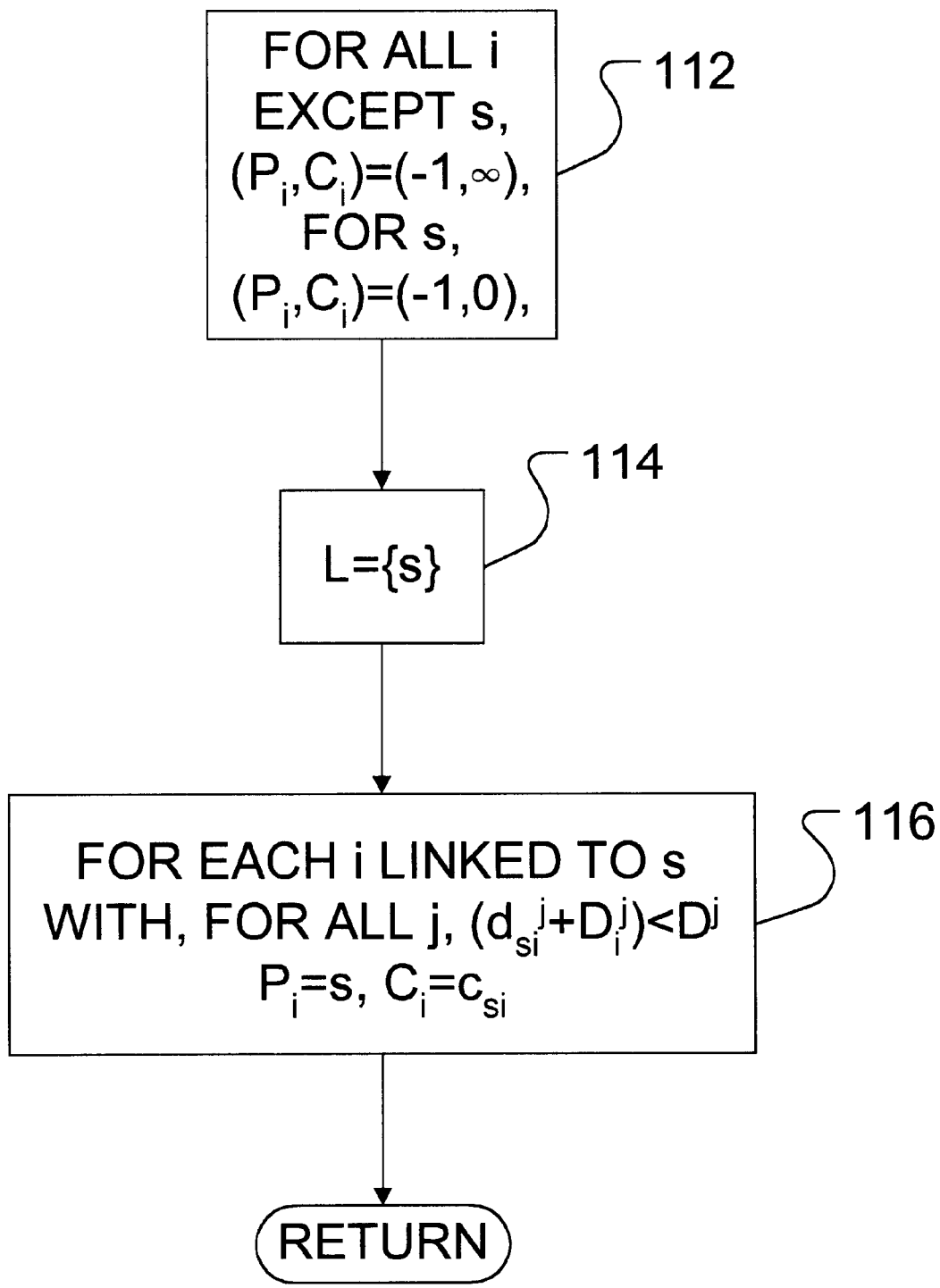
FIG. 14 illustrates, in a flow diagram, the steps of the initialization stage of phase II of a second embodiment of the invention, where there are m constraint metrics.

Referring to FIG. 14, which illustrates in a flow diagram the steps required in the initialization stage of phase II of this embodiment of the invention, each node i is associated with a pair ($P_i$, $C_i$), where $P_i$ is the current predecessor of the node i and $C_i$ is the cost from the source s to the node i for the path so far selected. The pairs for all nodes i (except node s) are initialized with values $P_i = -1$ and $C_i = \infty$, where $-1$ represents the situation in which no current predecessor of the node i is determined (node s is initialized with $P_s = -1$, $C_s = 0$) (step 112).

The set L is initialized with the start node, s (step 114). The set of nodes i under consideration is then reduced to those that have a link to s and for which, for all j, the jth constraint of the link (s, i), $d_{si}^j$, when added to the jth constraint of the node i, $D_i^j$, is less than the jth path constraint, $D^j$. The nodes not meeting these conditions are disregarded. For the nodes i that meet the above conditions, $C_i$ is assigned the cost, $c_{si}$, of the link (s, i) and the value s is assigned to $P_i$ (step 116).

Referring again to FIG. 13, a node k is chosen from the nodes i that are not already in the set L such that $C_k$ is the minimum of all $C_i$'s under consideration (step 98). Once k is determined (step 99), it is added to the set L (step 100). It is then determined whether the destination node is part of the set L (step 102). If the destination node is part of the set L, then phase II is complete. If the destination node is not part of set L, the process advances to the reevaluation stage.

Figure 15:
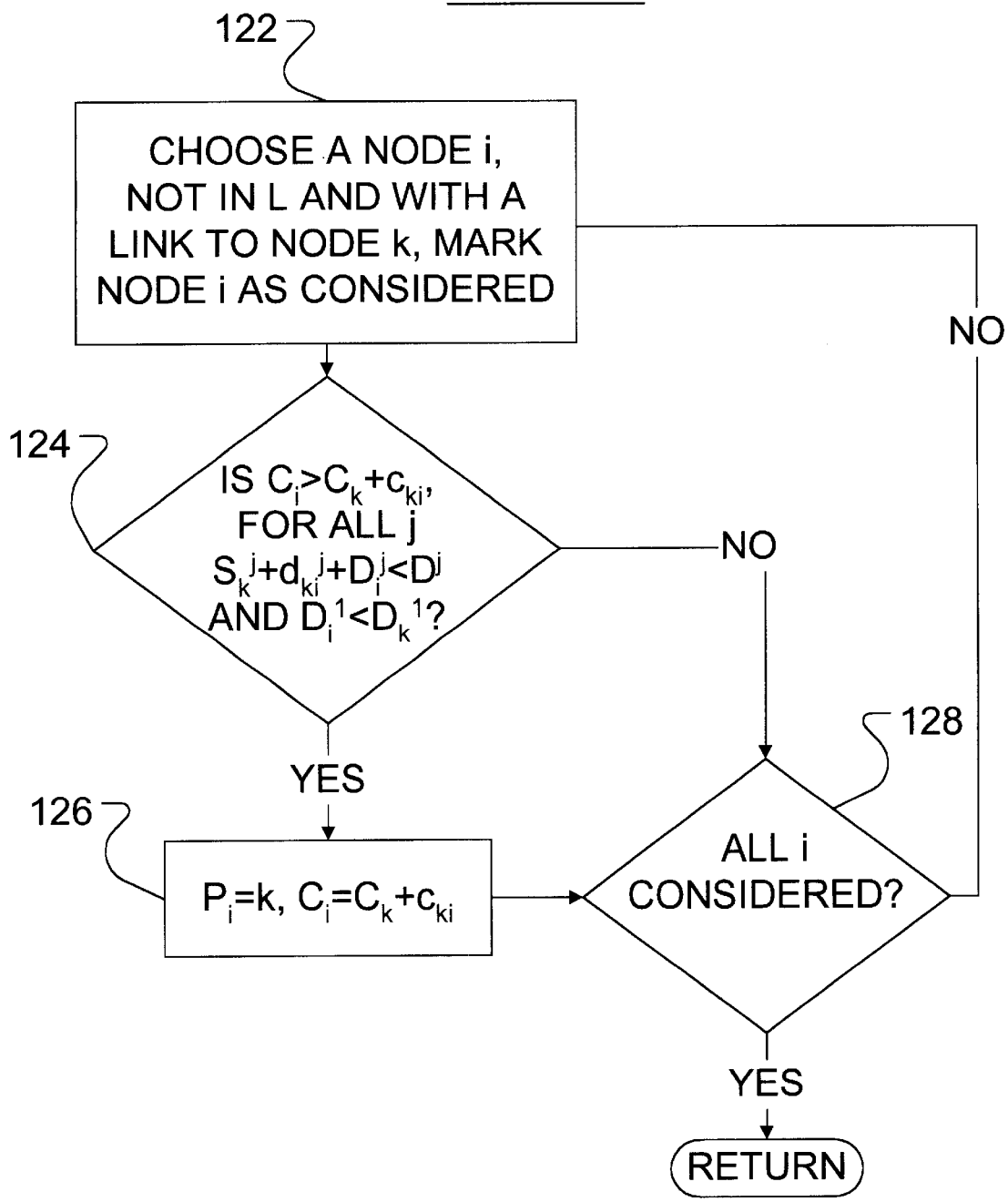
FIG. 15 illustrates, in a flow diagram, the steps of the reevaluation stage of phase II of a second embodiment of the invention, where there are m constraint metrics.

FIG. 15 illustrates, in a flow diagram, the steps involved in the reevaluation stage. Each node i which has a link to the most recently chosen node, k, and is not already in the set L, is tested with regard to three criteria. First, the value $C_i$ is compared with the sum of the cost associated with the node most recently added to set L, $C_k$, and the cost of the link from k to i, $c_{ki}$. Secondly, for each j, a sum of $S_k^j$ (the jth link constraints up to node k), $d_{ki}^j$ (the jth link constraint from k to i) and $D_i^j$ (the jth constraint of node i) is compared with $D^j$ (the jth path constraint) (step 124). Thirdly, the first of the m constraints of node i, $D_i^1$, is compared with the corresponding constraint of node k, $D_k^1$. Thus, a trend of decreasing constraints is only required for the first of the m constraints. This has the benefit that more potential paths are considered. If $C_i$ is greater than the sum of $C_k$ and $c_{ki}$, the sum of $S_k^j$, $d_{ki}^j$ and $D_i^j$ is less than $D^j$ for each j, and $D_i^1$ is less than $D_k^1$ then the value of $C_i$ is reassigned to be the sum of $C_k$ and $c_{ki}$ and $P_i$ is assigned the value k (step 126). In the event that all three conditions are not met, the process continues without changing the value of $C_i$ or $P_i$.

Referring to FIG. 13, once the reevaluation of the cost associated with each node $C_i$ is complete, the process then reverts to step 98.

Figure 16:
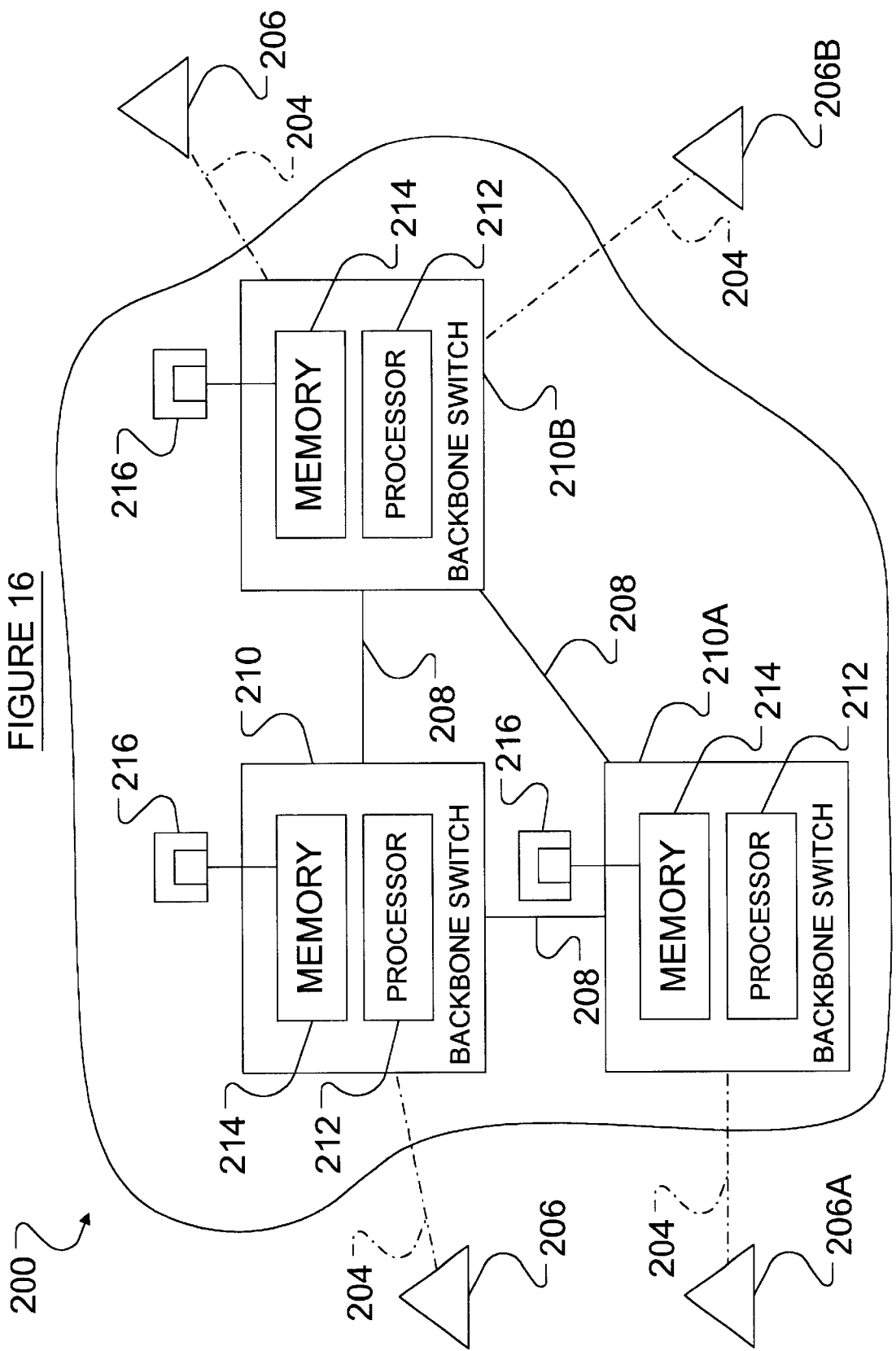
FIG. 16 schematically illustrates an ATM PNNI network suitable for use with this invention.

FIG. 16 illustrates an ATM PNNI network suitable for use with this invention. PNNI network 200 comprises a number of ATM backbone switch nodes 210 which are nodes interconnected by PNNI links 208. A number of ATM devices (work stations, servers or private ATM switches) 206 are connected to the backbone switch nodes 210 by UNI (User-to-Network Interface) 204 links. The backbone switch comprises a processor 212 and a memory 214 loaded with PNNI route computation software for executing the method of this invention from software media product 216.

In operation, if a backbone switch 210A receives a destination ATM address from an ATM device 206A indicating a request to connect to ATM device 206B, the switch, under control of software in memory 214, undertakes the method of this invention to determine an appropriate route to device 206B. In a conventional manner, the call is then set up over this route.

While making the assignment of step 66 (FIG. 5) and step 126 (FIG. 15) dependent in part on $c_i > c_k + c_{ki}$ of step 64 (FIG. 5) and step 124 (FIG. 15), the method would work, albeit not as optimally, for $c_i > f(c_k)$ for some functions, f. For example, f could be a constant between one and two.

While the exemplary primary link metric is the cost of a link which is to be minimized, the primary link metric could, instead, be a metric which is to be maximized. In such a case, the search for a minimum $c_i$ of step 38 (FIG. 3) would be a search for a maximum and the inequality $c_i > c_k + c_{ki}$ of step 64 (FIG. 5) becomes $c_i < c_k + c_{ki}$.

Figure 17:
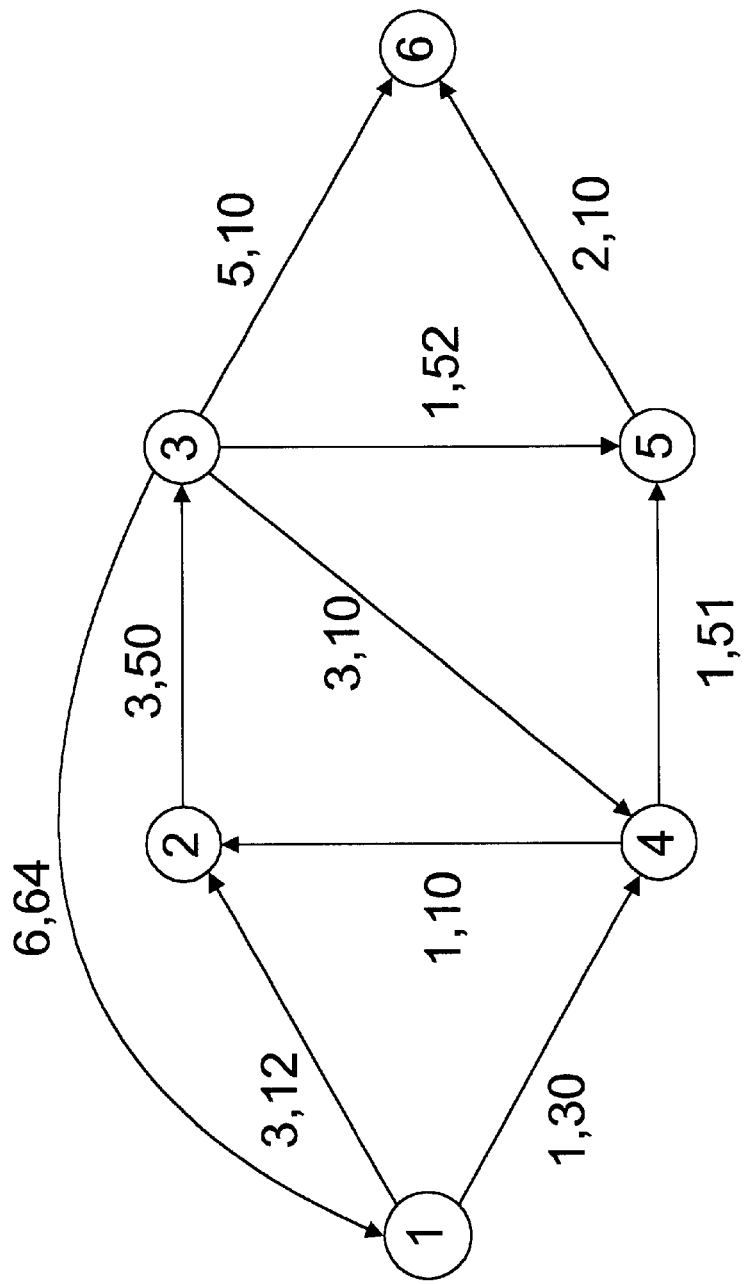
FIG. 17 is a schematic network of nodes modelling, as a directed graph, a communications network.

The method presented in this invention can be applied to communication networks which are modelled as directed graphs, such as the one shown in FIG. 17, with the following modification. In phase I, when expanding a spanning tree from the destination node (comprising steps 14 to 22 of FIG. 2 and steps 74 to 82 of FIG. 12), we consider only specified links, namely the reverse directed links from the nodes in the tree so far obtained. In phase II, when expanding a spanning tree from the source node (comprising steps 38 to 44 of FIG. 3 and steps 98 to 104 of FIG. 13), we consider only the forward directed links which start from the nodes in the tree so far obtained.

Other modifications will be apparent to those skilled in the art and, therefore, the invention is defined in the claims.

We claim:

1. In a communication system comprising nodes and links between said nodes, a method for determining a route from a start node to a destination node based on two quality of service link metrics, a primary link metric to be optimized and a secondary link metric to be limited to a secondary link metric path constraint, each of said metrics being additive, said said method comprising the steps of:
    associating a secondary link metric constraint with each of said nodes;
    initializing a set to include said start node;
    until said destination node is included in said set, undertaking the following steps:
        (a) for each node with a specified link to a node most recently included in said set, if
            (i) a new primary link metric comprising a sum of a primary link metric of said most recently included node and a primary link metric associated with said link between said each node and said most recently included node is more optimal than any primary link metric associated with said each node and
            (ii) a secondary link metric constraint associated with said each node is more optimal than a secondary link metric constraint associated with said most recently included node then,
        associating said each node with said most recently included node and associating said new primary link metric with said each node,
        (b) including a node in said set where said node was not in said set and had a primary link metric which was more optimal than any primary link metric associated with any other node not in said set; and
    selecting a route based on nodes in said set.

2. The method of claim 1 wherein the step (a) of associating in respect of said each node is further conditional on (iii) a sum of (A) a secondary link metric constraint for a path from said most recently included node to said start node through consecutively associated nodes, (B) a secondary link metric for a link between said most recently included node and said each node, and (C) a secondary link metric associated with said each node being no greater than said secondary link metric path constraint.

3. The method of claim 1 wherein said specified link to a node most recently included comprises any link from said each node to a node most recently included in said set.

4. The method of claim 3 wherein said secondary link metric constraint associating step further comprises the following steps:
    modelling said communication system as a graph with weights assigned to said links between said nodes, where said weights have values equivalent to said secondary link metrics;
    employing Dijkstra's Algorithm, with said graph as input, to obtain labels for each of said nodes;
    associating with each of said nodes said secondary link metric constraint equivalent to said label obtained in said Dijkstra's Algorithm employing step.

5. The method of claim 1 wherein said specified link to a node most recently included in said set comprises a directed link from said each node to a node most recently included in said set.

6. The method of claim 5 wherein said secondary link metric constraint associating step further comprises the following steps:
    modelling said communication system as a directed graph with weights assigned to said links between said nodes, where said weights have values equivalent to said secondary link metrics;
    considering only reversed directed links while employing Dijkstra's Algorithm, with said directed graph as input, to obtain labels for each of said nodes;
    associating with each of said nodes said secondary link metric constraint equivalent to said label obtained in said Dijkstra's Algorithm employing step.

7. The method of claim 1 including the step of initializing each node other than said start node with an arbitrarily high primary link metric.

8. The method of claim 1 wherein said step of selecting a route comprises selecting said destination node through consecutively associated nodes to said start node.

9. A computer software media product for providing program control for a processor in a communications system having nodes and links between said nodes for determining a route from a start node to a destination node based on two quality of service link metrics, a primary link metric to be optimized and a secondary link metric to be limited to a secondary link metric path constraint, each of said metrics being additive, said product comprising:
    means for associating a secondary quality of service link metric constraint with each of said nodes;
    means for initializing a set to include said start node;
    means for, until said destination node is included in said set, undertaking the following steps:
        (a) for each node with a specified link to a node most recently included in said set, if
            (i) a new primary link metric comprising a sum of a primary link metric of said most recently included node and a primary link metric associated with said link between said each node and said most recently included node is more optimal than any primary link metric associated with said each node and
            (ii) a secondary link metric constraint associated with said each node is more optimal than a secondary link metric constraint associated with said most recently included node then,
        associating said each node with said most recently included node and means for associating said new primary link metric with said each node,
        (b) including a node in said set where said node was not in said set and had a primary link metric which was more optimal than any primary link metric associated with any other node not in said set; and
    means for selecting a route based on nodes in said set.

10. A communications system comprising:
    nodes;
    links between nodes;
    a controller for determining a route from a start node to a destination node based on two quality of service link metrics, a primary link metric to be optimized and a secondary link metric to be limited to a secondary link metric path constraint, each of said metrics being additive, said controller comprising:

means for associating a secondary quality of service link metric constraint with each of said nodes;

means for initializing a set to include said start node;

means for, until said destination node is included in said set, undertaking the following steps:
(a) for each node with a specified link to a node most recently included in said set, if
(i) a new primary link metric comprising a sum of a primary link metric of said most recently included node and a primary link metric associated with said link between said each node and said most recently included node is more optimal than any primary link metric associated with said each node and
(ii) a secondary link metric constraint associated with said each node is more optimal than a secondary link metric constraint associated with said most recently included node then,
associating said each node with said most recently included node and means for associating said new primary link metric with said each node,
(b) including a node in said set where said node was not in said set and had a primary link metric which was more optimal than any primary link metric associated with any other node not in said set; and
means for selecting a route based on nodes in said set.

11. A router in a communications system having nodes and links between said nodes, a requirement for determining a route from a start node to a destination node based on two quality of service link metrics, a primary link metric to be optimized and a secondary link metric to be limited to a secondary link metric path constraint, each of said metrics being additive, said router comprising:

means for associating a secondary quality of service link metric constraint with each of said nodes;

means for initializing a set to include said start node;

means for, until said destination node is included in said set, undertaking the following steps:
(a) for each node with a specified link to a node most recently included in said set, if
(i) a new primary link metric comprising a sum of a primary link metric of said most recently included node and a primary link metric associated with said link between said each node and said most recently included node is more optimal than any primary link metric associated with said each node and
(ii) a secondary link metric constraint associated with said each node is more optimal than a secondary link metric constraint associated with said most recently included node then,
associating said each node with said most recently included node and means for associating said new primary link metric with said each node,
(b) including a node in said set where said node was not in said set and had a primary link metric which was more optimal than any primary link metric associated with any other node not in said set; and
means for selecting a route based on nodes in said set.

12. In a communication system comprising nodes and links between said nodes, a method for determining a route from a start node to a destination node based on at least two quality of service link metrics, a primary link metric to be optimized and at least one secondary link metric to be limited to corresponding secondary link metric path constraints, each of said metrics being additive, said method comprising the steps of:

for each of said at least one secondary link metric, associating a secondary link metric constraint with each of said nodes;

initializing a set to include said start node;

until said destination node is included in said set, undertaking the following steps:
(a) for each node with a specified link to a node most recently included in said set, if
(i) a new primary link metric comprising a sum of a primary link metric of said most recently included node and a primary link metric associated with said link between said each node and said most recently included node is more optimal than any primary link metric associated with said each node and
(ii) a first of said at least one secondary link metric constraints associated with said each node is more optimal than a corresponding secondary link metric constraint associated with said most recently included node then,
associating said each node with said most recently included node and associating said new primary link metric with said each node,
(b) including a node in said set where said node was not in said set and had a primary link metric which was more optimal than any primary link metric associated with any other node not in said set; and
selecting a route based on nodes in said set.

13. The method of claim 12 wherein the step (a) of associating in respect of said each node is further conditional on (iii) for each of said at least one secondary link metric, a sum of (A) a corresponding secondary link metric constraint for a path from said most recently included node to said start node through consecutively associated nodes, (B) a corresponding secondary link metric for a link between said most recently included node and said each node, and (C) a corresponding secondary link metric associated with said each node being no greater than said corresponding secondary link metric path constraint.

14. The method of claim 12 wherein said specified link to a node most recently included in said set comprises any link from said each node to a node most recently included in said set.

15. The method of claim 14 wherein said secondary link metric constraint associating step further comprises, corresponding to each secondary link metric, the following steps:

modelling said communication system as a graph with weights assigned to said links between said nodes, where said weights have values equivalent to each of said at least one secondary link metrics;

for each of said at least one secondary link metric, employing Dijkstra's Algorithm, with said graph as input, to obtain labels for each of said nodes; and associating with each of said nodes said secondary link metric constraint equivalent to said label obtained in said Dijkstra's Algorithm employing step.

16. The method of claim 12 wherein said specified link to a node most recently included in said set comprises a directed link from said each node to a node most recently included in said set.

17. The method of claim 16 wherein said secondary link metric constraint associating step further comprises the following steps:

modelling said communication system as a directed graph with weights assigned to said links between said nodes, where said weights have values equivalent to said secondary link metrics;

considering only reversed directed links while employing Dijkstra's Algorithm, with said directed graph as input, to obtain labels for each of said nodes;

associating with each of said nodes said secondary link metric constraint equivalent to said label obtained in said Dijkstra's Algorithm employing step.

18. The method of claim 12 including the step of initializing each node other than said start node with an arbitrarily high primary link metric.

19. The method of claim 12 wherein said step of selecting a route comprises selecting said destination node through consecutively associated nodes to said start node.

20. The method of claim 12 wherein said at least one secondary link metric comprises at least two secondary link metrics.

21. A computer software media product for providing program control for a processor in a communications system having nodes and links between said nodes for determining a route from a start node to a destination node based on at least two quality of service link metrics, a primary link metric to be optimized and at least one secondary link metric to be limited to corresponding secondary link metric path constraints, each of said metrics being additive, said product comprising:

means for, for each of said at least one secondary link metric, associating a secondary quality of service link metric constraint with each of said nodes;

means for initializing a set to include said start node;

means for, until said destination node is included in said set, undertaking the following steps:
(a) for each node with a specified link to a node most recently included in said set, if
(i) a new primary link metric comprising a sum of a primary link metric of said most recently included node and a primary link metric associated with said link between said each node and said most recently included node is more optimal than any primary link metric associated with said each node and
(ii) a new primary link metric comprising a function of a primary link metric of said most recently included node is more optimal than any primary link metric associated with said each node and
(iii) a first of said at least one secondary link metric constraints associated with said each node is more optimal than a corresponding secondary link metric constraint associated with said most recently included node then, associating said each node with said most recently included node and means for associating said new primary link metric with said each node,
(b) including a node in said set where said node was not in said set and had a primary link metric which was more optimal than any primary link metric associated with any other node not in said set; and means for selecting a route based on nodes in said set.

22. The computer software media product of claim 21 wherein said at least one secondary link metric comprises at least two secondary link metrics.

23. A communications system comprising:
nodes;
links between nodes;
a controller for determining a route from a start node to a destination node based on at least two quality of service link metrics, a primary link metric to be optimized and at least one secondary link metric to be limited to corresponding secondary link metric path constraints, each of said metrics being additive, said controller comprising, corresponding to each secondary link metric:

means for, for each of said at least one secondary link metric, associating a secondary quality of service link metric constraint with each of said nodes;

means for initializing a set to include said start node;

means for, until said destination node is included in said set, undertaking the following steps:
(a) for each node with a specified link to a node most recently included in said set, if
(i) a new primarily link metric comprising a sum of a primary link metric of said most recently included node and a primary link metric associated with said link between said each node and said most recently included node is more optimal than any primary link metric associated with said each node and
(ii) a first of said at least one secondary link metric constraint associated with said each node is more optimal than a corresponding secondary link metric constraint associated with said most recently included node then, associating said each node with said most recently included node and means for associating said new primary link metric with said each node,
(b) including a node in said set where said node was not in said set and had a primary link metric which was more optimal than any primary link metric associated with any other node not in said set; and means for selecting a route based on nodes in said set.

24. The communications system of claim 23 wherein said at least one secondary link metric comprises at least two secondary link metrics.

25. A router in a communications system having nodes and links between said nodes, a requirement for determining a route from a start node to a destination node based on at least two quality of service link metrics, a primary link metric to be optimized and at least one secondary link metric to be limited to corresponding secondary link metric path constraints, each of said metrics being additive, said router comprising:

means for, for each of said at least one secondary link metric, associating a secondary quality of service link metric constraint with each of said nodes;

means for initializing a set to include said start node;

means for, until said destination node is included in said set, undertaking the following steps:
(a) for each node with a specified link to a node most recently included in said set, if
(i) a new primary link metric comprising a sum of a primary link metric of said most recently included node and a primary link metric associated with said link between said each node and said most recently included node is more optimal than any primary link metric associated with said each node and
(ii) a first of said at least one secondary link metric constraint associated with said each node is more optimal than a corresponding secondary link metric constraint associated with said most recently included node then, associating said each node with said most recently included node and means for associating said new primary link metric with said each node, (b) including a node in said set where said node was not in said set and had a primary link metric which was more optimal than any primary link metric associated with any other node not in said set; and means for selecting a route based on nodes in said set.

26. The router of claim 25 wherein said at least one secondary link metric comprises at least two secondary link metrics.

* * * * *

UNITED STATES PATENT AND TRADEMARK OFFICE
CERTIFICATE OF CORRECTION

PATENT NO. : 6,377,551 B1
DATED : April 23, 2002
INVENTOR(S) : Luo et al.

It is certified that error appears in the above-identified patent and that said Letters Patent is hereby corrected as shown below:

Column 9,
Line 18, delete "said said method" and insert -- said method --.

Column 14,
Line 15, delete "new primarily link" and insert -- new primary link --.

Signed and Sealed this

Eleventh Day of February, 2003

JAMES E. ROGAN
*Director of the United States Patent and Trademark Office*